US005575077A

United States Patent [19]
Jung Tae

[11] Patent Number: 5,575,077
[45] Date of Patent: Nov. 19, 1996

[54] EXTENDABLE TAPE MEASURE

[76] Inventor: Oum Jung Tae, 505-1201 Hyundai Apt. #554 Kwangzang-Dong Sungdong-ku, Seoul, Rep. of Korea

[21] Appl. No.: 287,080

[22] Filed: Aug. 8, 1994

[30] Foreign Application Priority Data

Aug. 9, 1993 [KR] Rep. of Korea ................. 93-15220 U

[51] Int. Cl.⁶ ........................................... G01B 3/10
[52] U.S. Cl. ............................................. 33/767; 33/771
[58] Field of Search ........................... 33/755, 757, 761, 33/767, 769, 771; 242/381, 381.3, 381.6

[56] References Cited

U.S. PATENT DOCUMENTS

| | | | |
|---|---|---|---|
| 1,988,428 | 1/1935 | Carlson | 33/761 |
| 1,992,947 | 3/1935 | Hayward | 33/769 |
| 2,893,656 | 7/1959 | Carlson | 33/761 |
| 2,956,795 | 10/1960 | Foster | 33/761 |
| 3,214,836 | 11/1965 | West | 33/767 |
| 3,908,277 | 9/1975 | Rutty | 33/769 |
| 3,942,738 | 3/1976 | Rutty | 33/767 |
| 4,155,168 | 5/1979 | DuBois | 33/760 |
| 4,200,983 | 5/1980 | West et al. | 33/769 |
| 4,578,867 | 4/1986 | Czerwinski et al. | 33/761 |
| 5,007,178 | 4/1991 | Dewire et al. | 33/767 |

FOREIGN PATENT DOCUMENTS 104305 7/1899 Germany ................................ 33/769

Primary Examiner—Thomas B. Will
Attorney, Agent, or Firm—Ladas & Parry

[57] ABSTRACT

An extendable tape measure having a scale tape which is extended outward by its elasticity without a leaf spring. The tape measure has a case, a rotatable spool mounted in the case, a scale tape wound on the spool and a stopper mounted on the case for locking the scale tape. The spool has two facing flanges. Each of the flanges is provided at its peripheral edge with a rim extended inward. The scale tape can be extended outward by its elasticity or can be extended and retracted by turning the handle.

2 Claims, 3 Drawing Sheets

EXTENDABLE TAPE MEASURE

BACKGROUND OF THE INVENTION

1. Field of the Invention

The present invention relates to a tape measure, and more particularly to a tape measure in which its tape can be extended outward by itself and which is also extended and retracted by turning its handle.

2. Description of the Prior Art

A conventional tape measure has a case, a scale tape, a spool and a leaf spring for retracting the scale tape. Upon using the tape measure, the user pulls the scale tape from the case to measure a length of an object. After the measurement, the scale tape is retracted into the case and wound on the spool by restoring force of the leaf spring.

In order to use the above type of tape measure, the user must pull a desired length of the scale tape by his hand. Also, the tape measure must have the leaf spring having a length proportional to that of the scale tape (for example, a five meter tape measure requires about 3.5 meter length of a leaf spring). When the tape measure has an eight meter length of a scale tape, it requires a stronger leaf spring.

Accordingly, it is difficult to manufacture the longer leaf spring in technique and the longer leaf spring causes a high manufacturing cost of the tape measure. Furthermore, the above tape measure can not be used for a long time because of inferiority, breakage and rust of the leaf spring.

SUMMARY OF THE INVENTION

The present invention has been made in view of the above-described problems occurring in the prior art and an aspect of the invention is to provide an extendable tape measure which has a scale tape, which can be extended from a spool (a roller) outward by its elasticity, and which does not have a leaf spring in order to prolong service life.

In accordance with the present invention, the object mentioned above can be accomplished by providing an extendable tape measure comprising: a case having a slit; a rotatable spool mounted in the case which has both flanges and a handle secured to a side thereof, each of the flanges is provided at its peripheral edge with a rim extended inward; a scale tape wound on the spool and extended and retracted through the slit of the case; and a stopper mounted on the case for locking and releasing the scale tape; whereby the scale tape can be extended outward by its elasticity or can be extended and retracted by turning the handle.

The case may be provided at its inner surface with a protrusion for blocking backward movement of the stopper, and the stopper may be provided at its rear end with an elastic hoop and an inner protrusion formed in the hoop.

The stopper may be provided at its front end with a locking portion for locking the scale tape.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

An embodiment according to an extendable tape measure of the present invention will be described with reference to the accompanying drawings hereinafter.

Figure 1:
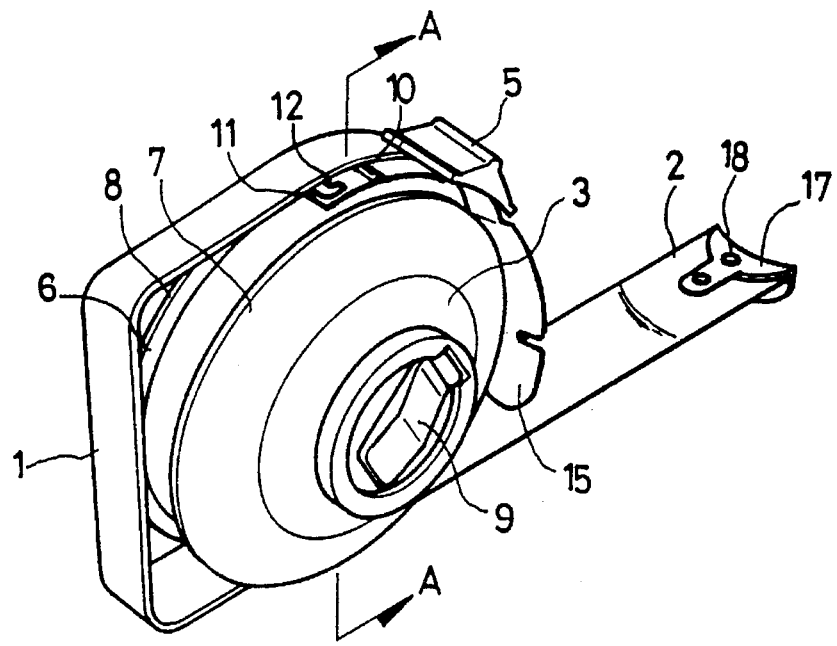
FIG. 1 is a perspective view of a tape measure according to the invention in which a half of a case is removed for showing its internal structure.
Figure 2:
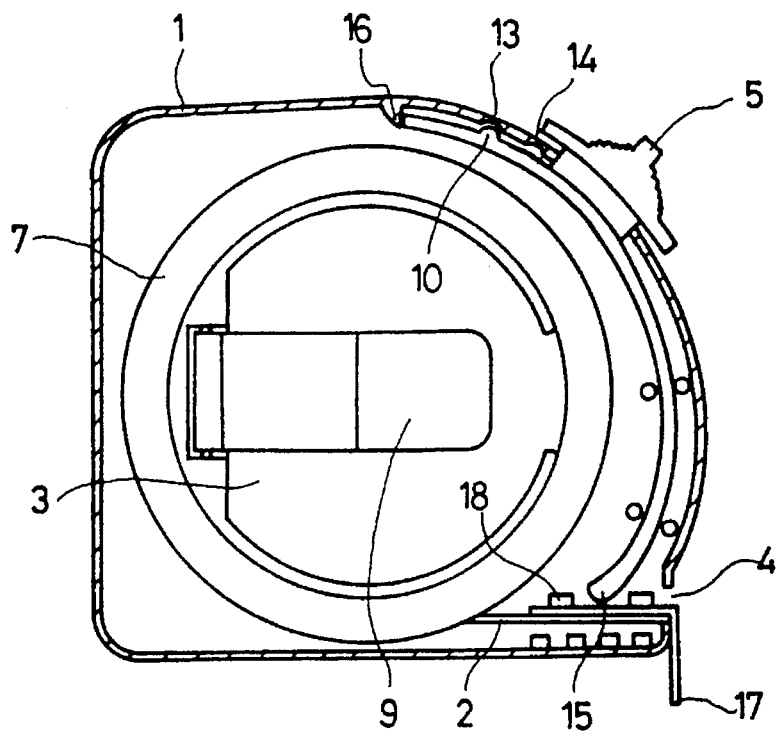
FIG. 2 is a sectional view of the tape measure shown in FIG. 1.

FIGS. 1 and 2 show an extendable tape measure according to the invention. As shown in the drawings, the extendable tape measure has a case 1 and a rotatable spool 3 on which a scale tape 2 is wound and which is provided in the case 1. The case 1 is formed with a slit 4 at its lower and front end and provided with a stopper 5 for preventing outward extension of the scale tape above the slit 4.

As illustrated in FIG. 2, the stopper 5 is in contact at its upper elastic hoop end 11 with a blocking protrusion 16 formed at an inner surface of the case 1. The other lower locking end 15 of the stopper 5 is in contact with a rivet 18 for fixing a hook 17 to an end of a scale tape 2.

The stopper 5 are formed with a protruded line 10 at a location spaced from the upper end 11. The protruded line 10 of the stopper 5 is engaged with a neutral groove 13 formed at an inner surface of the case 1 under a rest position. The case 1 is also formed with a second stopping groove 14 under the neutral groove 13.

Figure 3:
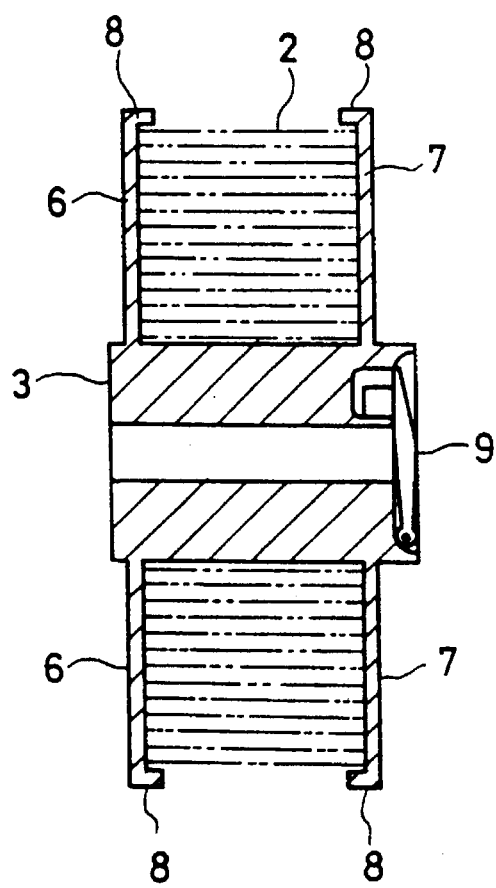
FIG. 3 is a sectional view taken along line A—A of FIG. 1 for showing the condition of a scale tape wound on a spool.

Referring to FIG. 3 which is taken along line A—A of FIG. 1, there is shown a section of the spool 3 on which the scale tape 2 is wound. As shown in the drawing, the spool 3 has two flanges 6 and 7. Each of the flanges 6 is provided at its peripheral edge with an inner rim 8 extended inward such that a spacing between the inner rims 8 of the flanges 6 and 7 is narrower than that between the flanges 6 and 7.

Figure 4:
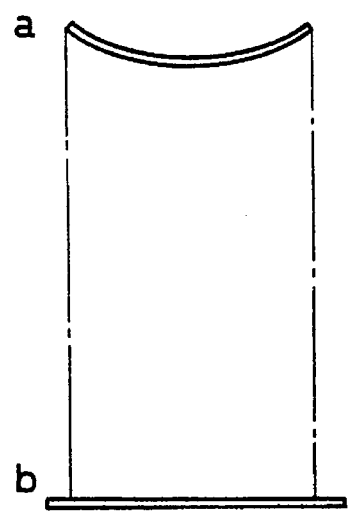
FIG. 4 is a sectional view of the scale tape showing an unwound scale tape (a) and a wound scale tape (b)

Referring to FIG. 4, there is shown sections of the scale tape when the scale tape is wound on the spool (see b) and when the scale tape is unwound from the spool (see a). As shown in the drawing, the width of the scale tape 2 under the unwound condition is narrower than that under the wound condition because the scale tape 2 becomes concave in section. Accordingly, although the scale tape 2 can not escape from the spool 3 due to the inner rims 8 under the wound condition because the scale tape 2 is increased in width, the scale tape 2 can freely escape from the spool 3 under the unwound condition because the scale tape 2 is decreased.

If the inner rims 8 are not formed at the peripheral edge of the flanges 6 and 7 of the spool 3, the scale tape 2 escapes from the spool 3 in the case 1 and thus is jammed in the case 1, so that the scale tape 2 cannot be smoothly extended and retracted. For solving the above problem, the spool 3 of the invention is provided with the inner rims 8 at the flanges 6 and 7.

The scale tape 2 of the invention is made of a steel plate and shaped into a concave section. Hence, the scale tape 2 wound on the spool 3 which is flat in section has an elasticity causing the flat scale tape 3 to be concave.

When the user uses the tape measure of the invention, the user pushes the stopper 5 upward and reward. At this time, the lower locking end 15 of the stopper 5 is raised from the rivet 18 and thus the scale tape 2 is extended through the slit 4 by its elasticity. When the scale tape 2 is extended to a desired length, the user pushes the stopper 5 downward and forward to lock the scale tape 2.

Figure 5A:
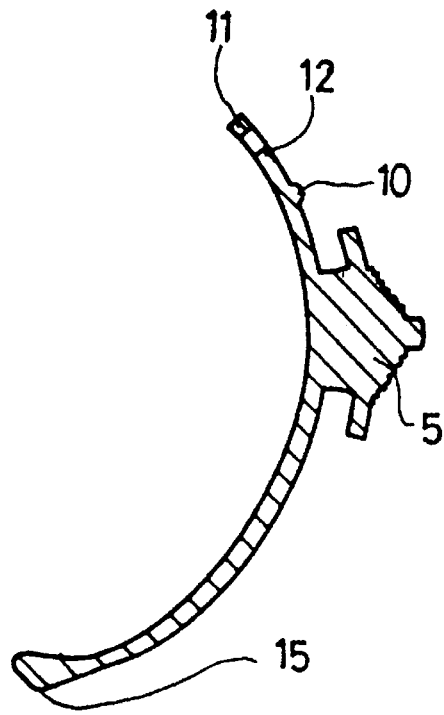
FIG. 5a is a sectional view of a stopper of the invention.
Figure 5B:
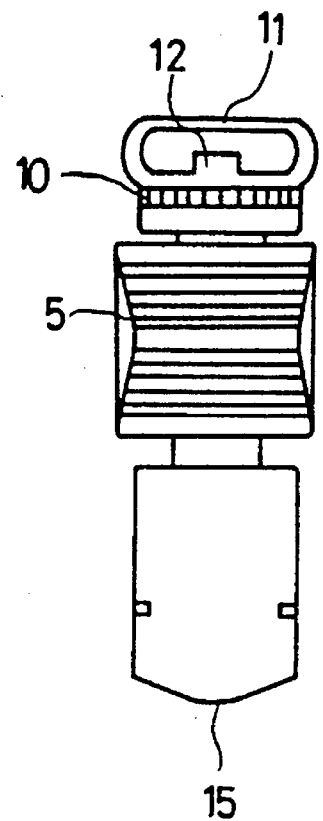
FIG. 5b is a plan view of the stopper.

Referring to FIG. 5, there is shown the stopper 5 of the invention. The stopper is made of high impact polystyrene which is excellent in restoring force. The upper end of the stopper is formed with the elastic hoop end 11. An inner protrusion 12 is provided in the hoop end 11. The inner protrusion 12 is formed at a lower side of the hoop end 11. The protruded line 10 is engaged with the neutral groove 13 during normal rest condition.

Operation of the tape measure of the invention will now be described.

Figure 6:
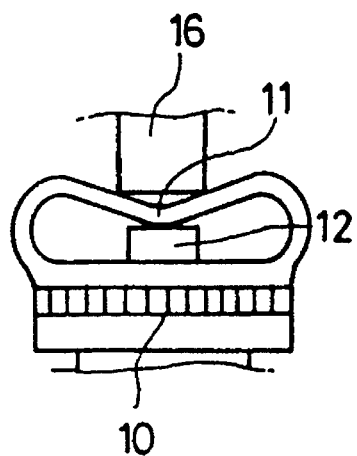
FIG. 6 is an enlarged view of a hoop end of the stopper in which the upper side of the hoop end is elastically bent inward because of upward movement of the stopper.

When the stopper 5 is pushed upward and rearward, the elastic hoop end 11 comes in contact with the blocking protrusion 16 and thus the hoop end 11 is bent inward, as shown in FIG. 6. At the same time, the protruded line 10 escapes from the neutral groove 13 and is somewhat moved toward the blocking protrusion 16. Also, the lower locking end 15 of the stopper 5 is raised from the rivet 18, so that the end of the scale tape 2 is released from the engagement with the locking end 15.

Upon releasing the end of the scale tape 2, the scale tape 2 is extended outward through the slit 4 by its elasticity. When the scale tape 2 is extended to a desired length, the user pushes the stopper 5 toward the slit 4. As the stopper 5 is pushed downward, the protruded line 10 is engaged with the second stopping groove 14, and the lower locking end of the stopper 5 presses down the scale tape 2 to lock the scale tape.

When the user retracts the extended scale tape 2 into the case 1 after use of the tape measure, the stopper 5 is pushed upward by the user's finger; and then the protruded line 10 is engaged with the neutral groove 13. Under the condition that the protruded line 10 is engaged with the neutral groove 13, the user turns the handle 9 fixed to the spool 3 to wind the scale tape 2 on the spool 3, thereby retracting the scale tape 2. In the tape measure of the invention, the scale tape 2 can be also extended by turning the handle 9.

When the retraction of the scale tape 2 is almost finished, the rivets 18 secured to the end of the scale tape 2 passes through the lower locking end 15 of the stopper 5 while raising the lower locking end 15. After the complete retraction, the rivet 18 is caught by the lower locking end of the stopper 5, thereby preventing the scale tape 2 from being extended outward.

Alternatively, the scale tape 2 is wound and unwound on the spool 3 in such a manner that the spool 3 is rotated by an electric motor instead of the handle 9.

As is apparent from the above description, since the tape measure according to the present invention has the scale tape 2 which is extended outward by its elasticity, the conventional leaf spring is not necessary. Hence, the internal structure of the tape measure is simplified. In addition, since the scale tape of the tape measure of the invention can be extended by itself, it is not necessary to pull the scale tape, thereby causing operation of the tape measure to be convenient.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tape measure comprising:

(a) a case having a slit;

(b) a rotatable spool mounted in the case, the spool having two flanges, each flange having an inner rim;

(c) a handle attached to the spool for rotating the spool;

(d) a scale tape wound on the spool, the tape having an elasticity for extending the tape through the slit of the case, the tape being retractable through the slit of the case by turning the handle, the tape being positioned on the spool by the inner rim of each flange; and (e) a stopper mounted on the case, the stopper being moveable to a forward position for locking the scale tape, the stopper being moveable to a backward position for releasing the scale tape, wherein the case has an inner surface with a protrusion for blocking backward movement of the stopper when the stopper is being moved to the backward position for releasing the scale tape, the stopper having a rear end with an elastic hoop and an inner protrusion in the hoop.

2. An extendable tape measure according to claim 1, in which the stopper is made of high impact polystyrene.

* * * * *